United States Patent [19]
Karasawa

[11] Patent Number: 5,663,779
[45] Date of Patent: Sep. 2, 1997

[54] VARIABLE TRANSMISSION LIGHT POLARIZING LENS ASSEMBLY

[75] Inventor: Naoki Karasawa, Ann Arbor, Mich.

[73] Assignee: Ozmix, Inc., Ann Arbor, Mich.

[21] Appl. No.: 369,044

[22] Filed: Jan. 5, 1995

Related U.S. Application Data

[63] Continuation-in-part of Ser. No. 208,130, Mar. 9, 1994, abandoned.

[51] Int. Cl.$^6$ .................................... G02C 7/12
[52] U.S. Cl. .................................... 351/49; 351/41
[58] Field of Search .................................... 351/49, 44, 41, 351/158; 359/465, 483

[56] References Cited

U.S. PATENT DOCUMENTS

| | | |
|---|---|---|
| 2,298,058 | 10/1942 | Land .................................... 88/65 |
| 3,371,979 | 3/1968 | Catanzaro .................................... 351/49 |
| 4,119,369 | 10/1978 | Eloranta .................................... 351/49 |
| 4,149,780 | 4/1979 | Young .................................... 351/49 |
| 4,386,832 | 6/1983 | Nannini .................................... 351/49 |
| 4,511,225 | 4/1985 | Lipson .................................... 351/49 |
| 4,595,262 | 6/1986 | Ogle .................................... 350/404 |
| 4,878,748 | 11/1989 | Johansen et al. .................................... 351/44 |
| 4,913,536 | 4/1990 | Barnea .................................... 350/419 |
| 5,124,734 | 6/1992 | Barnea .................................... 351/169 |
| 5,210,552 | 5/1993 | Baran et al. .................................... 351/49 |

FOREIGN PATENT DOCUMENTS

| | | | |
|---|---|---|---|
| 1049920 | 8/1953 | France | .................................... 351/49 |
| 9400790 | 1/1994 | WIPO | .................................... 351/49 |

*Primary Examiner*—Hung X. Dang
*Attorney, Agent, or Firm*—Young & Basile

[57] ABSTRACT

A sealed, polarizing lens assembly including a frame, a first light polarizing lens element, a second light polarizing lens element superimposed with the first lens element and rotatable in relation to the first lens element. The frame and the first element define a sealed chamber in which the second element is entirely enclosed and rotatable relative to the first pair of elements. Means for rotating the second internal element in the sealed chamber relative to the first pair of elements are provided. In one form the means for rotating the internal element in the seal chamber comprise a sealed gearing mechanism with user-accessible external actuators. The sealed, easily-adjusted lens assembly of the invention prevents contamination of internal lens surfaces by dust and moisture, for example. The seal chamber can also be provided with a fluid or gas with desired optical or thermal barrier characteristics.

16 Claims, 12 Drawing Sheets

VARIABLE TRANSMISSION LIGHT POLARIZING LENS ASSEMBLY

This is a continuation-in-part of application Ser. No. 08/208,130 filed on Mar. 9, 1994 now abandoned.

TECHNICAL FIELD

The invention relates generally to lenses comprising superimposed light polarizing elements which are selectively rotatable to vary the amount and wave lengths of light transmitted through the lenses.

BACKGROUND ART

Spectacles having superimposed polarizing lenses are well known. U.S. Pat. No. 2,005,426 discloses sunglasses having two superimposed polarized lenses mounted in conventional spectacle frames. One of the two lenses is fixed in relation to the frame, while the other is rotatable in relation to the first lens. In this fashion, the pair of polarized lenses for each eye may be adjusted in relation to one another, thereby regulating the light transmission through the lens pair.

U.S. Pat No. 4,119,369 issued to Vaitok Eloranta and Benjamin Ruggles describes superimposed pairs of light polarizing elements, one pair of such elements being fixed and another pair being rotatable with respect to the fixed pair to provide variable light transmission. In this device, the lens pairs are superimposed in a single eyeglass frame, and the rotating lenses are interconnected by a tie bar to insure nearly identical axial rotation of the rotating elements.

U.S. Pat. Nos. 4,592,262 and 5,210,552 disclose pairs of polarized lens elements which are synchronized in rotation through a centrally mounted gear. Both of these devices comprise separate lens elements, one superimposed over the other.

Further, it is known that ophthalmic lenses may be designed incorporating fluids for the purposes of creating variable power lenses. See, for example, U.S. Pat. Nos. 4,913,536 and 5,124,734. The benefit of the application of this technology to superimposed polarizing lenses is the reduction of surface reflection and refraction resulting from the incidence of light on multiple surfaces in superimposed lenses.

SUMMARY DISCLOSURE OF INVENTION

None of the prior art has directly addressed the problem of lens contamination and the associated cleaning requirement for lenses having superimposed elements. The existing technology dictates the disassembly of the lens elements to effect cleaning.

The present invention utilizes a sealed lens assembly, which, in one embodiment, may be fluid-filled, to address the foregoing shortcomings of the existing art.

In general, the invention is achieved with a sealed lens assembly having a frame, a first light polarizing lens element, and a second light polarizing lens element superimposed with the first lens element and rotatable in relation to the first lens element to affect light transmission through the lens elements. A first lens element comprises a sealed chamber having a front pane and a rear pane joined by a continuous wall section of the frame to define the chamber. The second lens element comprises a transparent element disposed entirely within the sealed chamber for rotation therein. The inventive lens assembly further includes means for rotating the second lens element in axial relationship to the first lens element.

The second lens element is adjusted by the user via external actuation means. Adjustments are transmitted to internal drive means within the sealed chambers by sealed force-transmitting means to rotate the second lens elements, for example internal polarized lenses.

In one embodiment the inventive lens assembly is employed in a pair of light polarizing spectacles in which a pair of the lens assemblies are operated by a single, user-accessible rotation mechanism actuated from the exterior of the sealed chambers.

In further embodiments the means for rotating the second (internal) lens elements in the sealed chambers comprise gear or belt-drive mechanisms. The external actuating means can include indicia indicating the degree of adjustment.

In another embodiment of the invention the front pane of the sealed lens assembly is formed from a transparent material, while the rear pane of the lens assembly is a polarizing material. The internal lens element rotatable within the chamber defined by the front and rear panes also comprises a polarizing material which cooperates with the polarizing rear pane to affect light transmission through the lens assembly when the internal lens element is rotated.

These and other features of the present invention will become apparent upon further reading of the specification.

DETAILED DESCRIPTION OF THE ILLUSTRATED EMBODIMENTS

Figure 1:
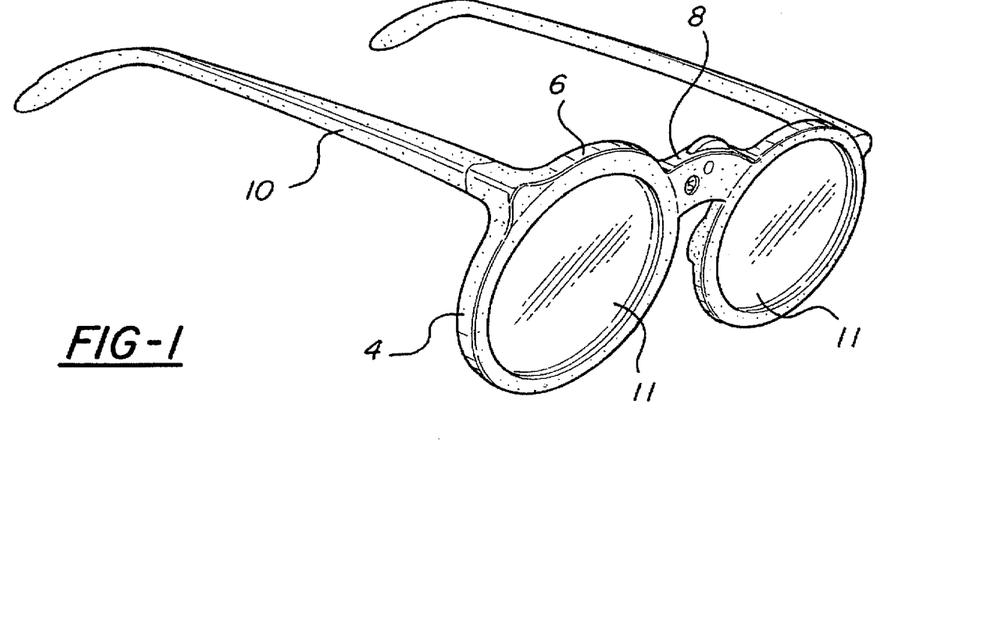
FIG. 1 is a perspective view of sealed lens assemblies according to the present invention incorporated into a pair of spectacles.

FIG. 1 is a suitable starting point for discussion of the overall concept of the invention. The invention, by way of example, is shown incorporated into a pair of spectacles. Such spectacles, conventional in many respects, are defined by a spectacle frame 6 having a nose piece 8 and ear pieces 10. The structure of the individual lens assemblies 11, corresponding to the left and right eyes of the wearer, is seen in further detail in FIGS. 2 and 3. Each lens assembly 11 comprises a sealed hollow chamber 12 defined by rear and front frame portions 6a, 6b forming a continuous wall 4. Rear frame 6a holds a front pane 16 and front frame 6b holds a rear pane 14. In the preferred embodiment, front pane 16 is formed from a transparent material, while rear pane 14 is a polarizing material. When the front pane, wall section and rear pane are assembled, they define hollow chamber 12 containing internal lens element 56.

Figure 2:
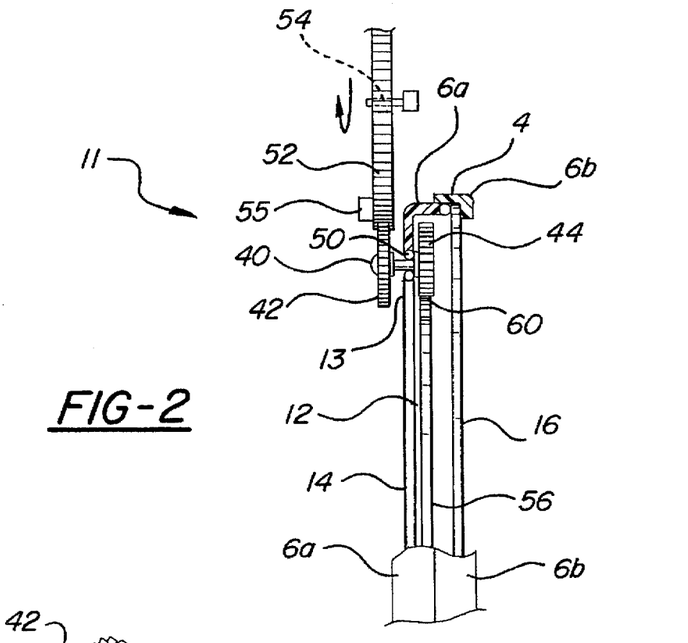
FIG. 2 is a plan sectional view of a lens assembly in the spectacles of FIG. 1.
Figure 3:
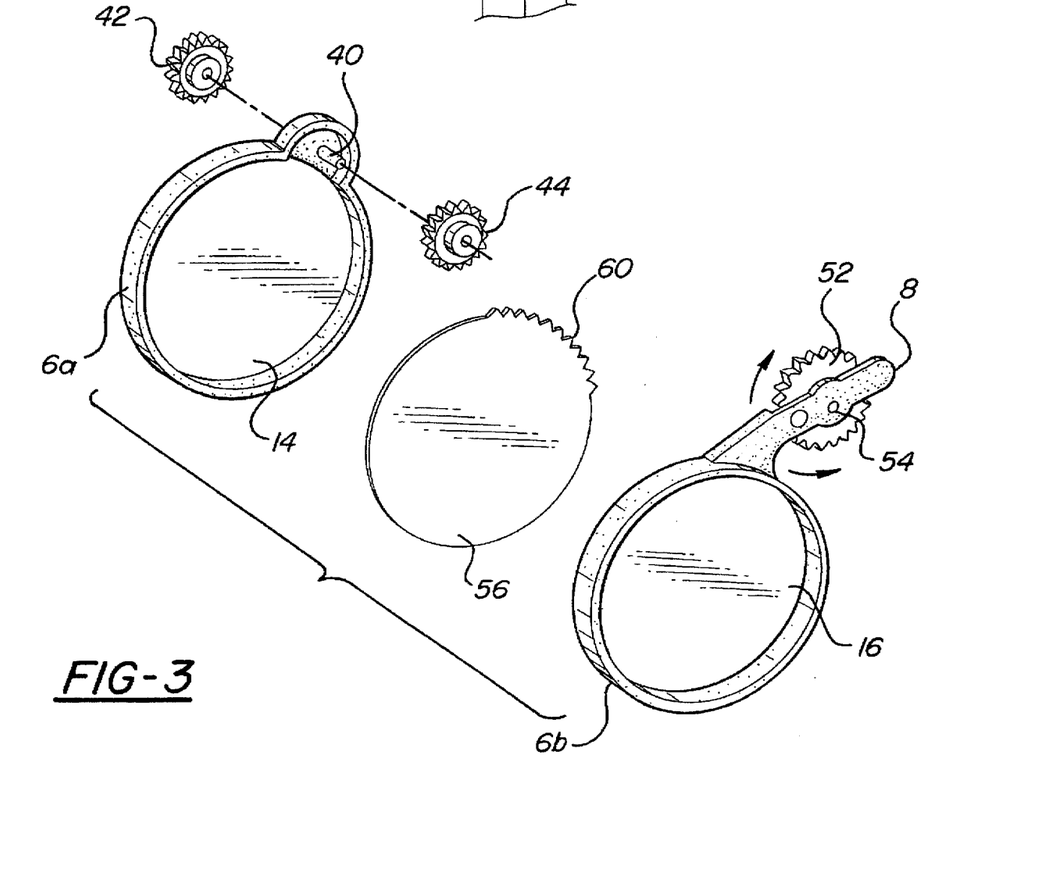
FIG. 3 is an exploded perspective view of the lens assembly of FIG. 2.

Internal lens element 56 preferably comprises a light transmissive polarizing element, and is provided with a driven gear 60. The diameter of internal lens element 56 is selected to insure a relatively precise fit of internal lens element 56 relative to the frame wall within chamber 12. An opening 13 is formed in rear pane 14 to accommodate a shaft 40. An o-ring 50 is disposed about the circumference of the shaft opening 13 to provide a fluid-tight seal between chamber 12, rear pane 14 and rotating shaft 40. External drive gear 42 is secured to shaft 40 outside chamber 12, and the shaft 40 is inserted through o-ring 50 previously mounted around the shaft opening 13. Internal drive gear 44 is mounted to the opposite end of rotating shaft 40 in chamber 12, such that rotation of external drive gear 42 results in simultaneous rotation of shaft 40 and internal drive gear 44. Internal drive gear 44 engages driven gear 60 affixed to internal lens element 56. In this fashion, rotation of external drive gear 42 is transmitted as rotational motion affecting the rotational position of internal lens element 56 in chamber 12 relative to panes 14, 16.

In the preferred embodiment, each lens assembly 11, chamber 12 and internal lens element 56 constitute a sealed unitary combination lens assembly whereby the interior chamber 12, as defined by the inside surface of pane 14, the inside surface of pane 16 and the inner surface of the wall 4 defined by frame portions 6a, 6b constitute a sealed unit substantially resistant to contamination. Accordingly, chamber 12, the interior surfaces of panes 14, 16 and both surfaces of internal lens 56 remain relatively free of outside contaminants.

Figure 4:
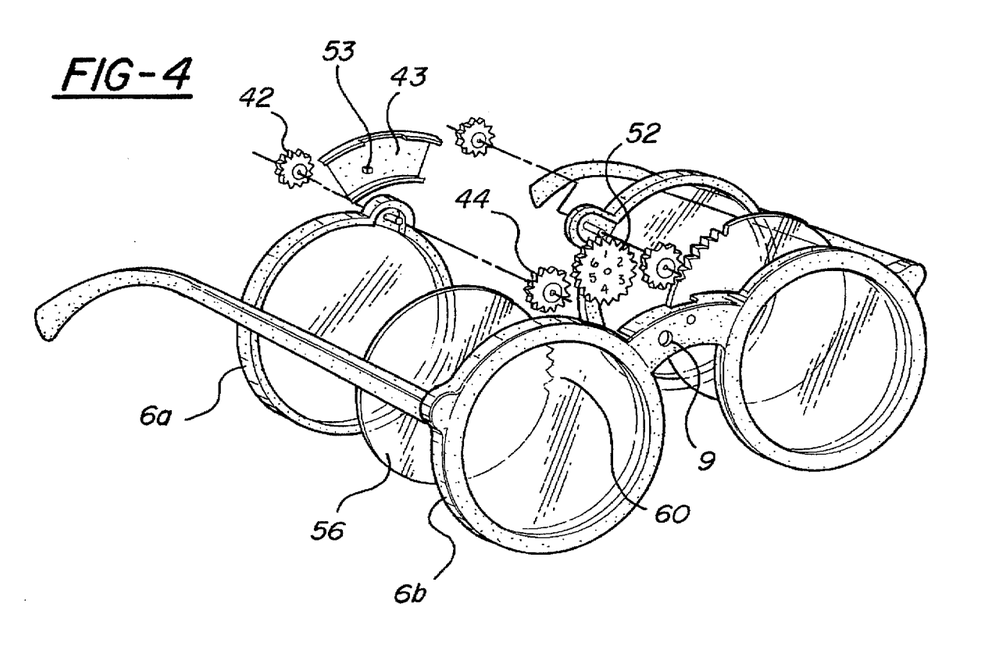
FIG. 4 is an exploded perspective view of the spectacles of FIG. 1.

A main gear 52 is pivotably attached to a pivot 54 affixed to nose piece 8. The diameter of main gear 52 is selected to effect engagement of the teeth of main gear 52 with the teeth of external drive gears 42 on each lens assembly 11. A gear enclosure plate 43 is provided with stop 53 which limits the rotational arc of main gear 52 in relation to the nose piece 8. Gear enclosure plate 43 attaches to nose piece 8 to partially enclose gears 52 and 42. This rotational limitation is provided to insure that internal lens elements 56 are rotationally limited to an arc of approximately 90 degrees. Second stop 55 on main gear 52 engages stop 53 to affect this limitation in rotation.

Referring now to FIGS. 3 and 4, the detailed interaction of the internal lens element 56, driven gear 60, internal drive gear 44, external drive gear 42 and main gear 52 is as follows. Main gear 52 is pivotably mounted to pivot 54, which, in turn, is secured to nose piece 8. The teeth of main gear 52 engage the teeth of external drive gear 42 which is fixed to rotating shaft 40. Internal drive gear 44 is likewise fixed to rotating shaft 40. As main gear 52 is rotated through its previously defined arc, external gear 42 and internal gear 44 follow main gear 52 in rotation, thereby driving driven gear 60 affixed to internal lens element 56. As internal lens element 56 rotates in relationship to the pane 16 in chamber 12, the polarizing effect of the two lenses results in a variation of the light transmissibility through the lens assembly 11.

As shown in FIG. 4, main gear 52 can be provided with indicia showing the degree of rotation of internal lenses 56, for example visible though an aperture 9 in the frame. This gives the user a repeatable setting for the desired polarizing effect.

The sealed nature of each lens assembly protects chamber 12 and internal lens element 56 rotating therein from contaminants such as moisture and dust. In a preferred mode of the invention, chamber 12 is hermetically sealed and filled with a fluid or gas having desirable thermal or optical properties. Water or dust-resistant sealing will be suitable for some purposes, depending on the intended use.

In the preferred embodiment, the internal lens element 56 and rear pane 16 are selected from the class of linear or circular polarizing materials. Linear polarizers transmit only linearly polarized light, and circular polarizers transmit only right-handed or left-handed polarized light. The polarizers may be neutral or tinted. With a tinted polarizer, the polarizer itself may be colored, or a neutral colored polarizer may be combined with a tinted substrate to give the desired color transmission property.

In a second embodiment, internal lens element 56 and pane 16 are selected based on the transmission of selective wave lengths of light. For example, the internal lens element 56 may embody a film of two layers of tinted polarizing films laminated so that the angle between the polarization axis of the film is 90 degrees. These color polarizing films absorb only the light within a selective range of wave lengths. Pane 14 is, in this embodiment, a neutral density polarizing material. In this way, the angle between the polarization axis of the neutral polarizer and that of the internal lens element 56 determines the color transmission property.

With a hermetically sealed chamber 12, a further benefit can be derived by creating a thermal barrier, by virtue of the thermal insulating properties of a suitable gas or fluid introduced into and sealed within the chamber. Such fluid-filled, sealed chambers act to limit rapid heat exchange, thereby minimizing fogging of the lens when moved from a cold to a warm environment, for example.

In a further embodiment of the invention, chamber 12 is filled with an optically transmissive fluid, such as microscopic emersion oil, which has a similar index of refraction as the internal lens element 56, rear pane 14 and front pane 16. Fluid 70 surrounds internal lens element 56 and wets the entire internal chamber 12, including the inside surfaces of rear pane 14 and front pane 16, thereby eliminating or significantly reducing the reflective refractive interference from light incident on the surfaces of the chamber and internal lens element. For practical purposes, introduction of fluid into the chamber creates a single unitary optical element because of the matching of the index of refraction of the rear pane 14, internal lens element 56 and front pane 16.

In still a further embodiment, chamber 36 is filled with a dry gas and desiccant "getter" which serves to absorb any moisture which may tend to form on the inner surfaces of the chamber element or the surfaces of the internal lens element, as a result of temperature changes and resultant condensation.

Because the present invention seals the rotatable polarizing element of the polarizing assembly and each lens assembly 11 from any source of outside contamination (e.g. dust, sweat, rain), cleaning of the lens assembly of the present invention is no more complicated than cleaning an ordinary pair of eye glasses; i.e., the wearer simply gives an occasional surface cleaning to the outside surfaces of panes 14 and 16. Additionally, the illustrated seal between the outer, user-operated portions of the adjustment mechanism (52, 42) and the internal drive components 44, 60 associated with the internal lens 56 eliminates contamination and subsequent cleaning of the portions most closely associated with the internal lens surfaces.

Alternate adjustment mechanisms for the sealed lens assembly of the present invention are illustrated in FIGS. 5–14, and 20–24.

Figure 5:
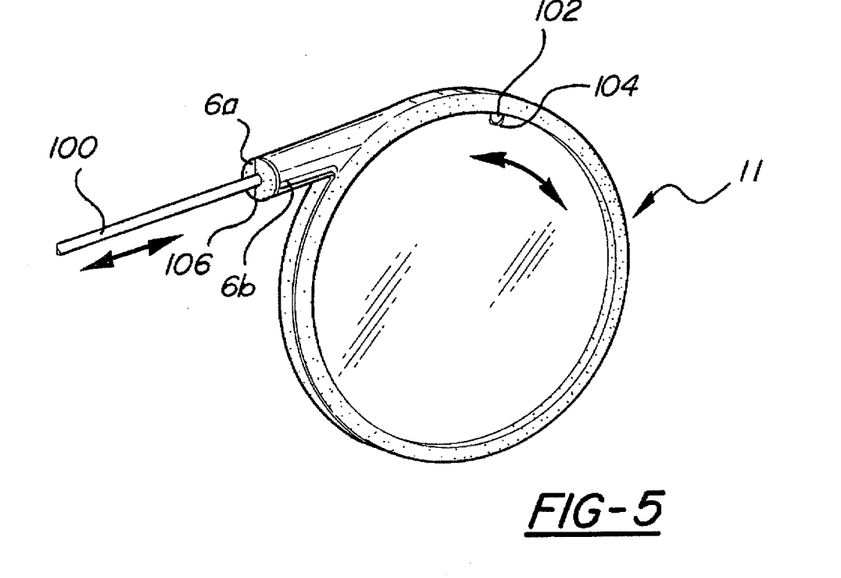
FIG. 5 illustrates an alternate drive mechanism for a lens assembly suitable for incorporation into a spectacle frame.

Referring to FIGS. 5–8, a semi-flexible belt 100 with hook portions 102 is suitably secured to notches 104 in each internal lens element 56. Belt 100 rides in a channel 106 formed in the mating frame elements 6a, 6b as best shown in FIG. 5. The point at which belt 100 exits chamber 12 between the frame elements 6a, 6b is either formed from or includes a relatively soft, sealing material, for example, a suitable rubber, which engages belt 100 in sealing fashion. In the illustrated embodiment the frame material is sufficiently resilient to form a dust and water-resistant seal with belt 100.

Figure 6:
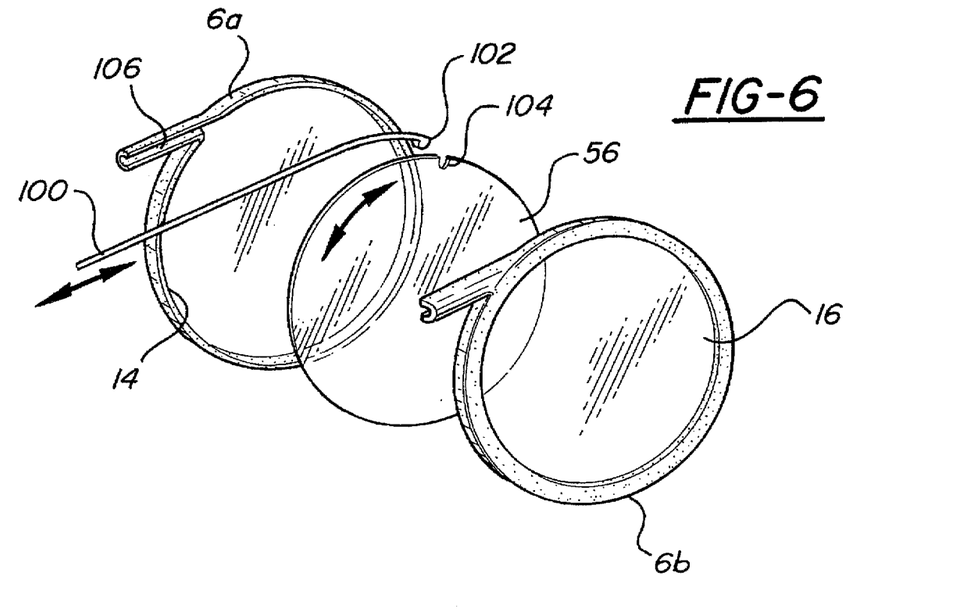
FIG. 6 is an exploded perspective view of the device of FIG. 5.

As belt 100 moves back and forth in the direction of the arrows in FIGS. 5 and 6, the associated internal lens element 56 is rotated accordingly.

Figure 7:
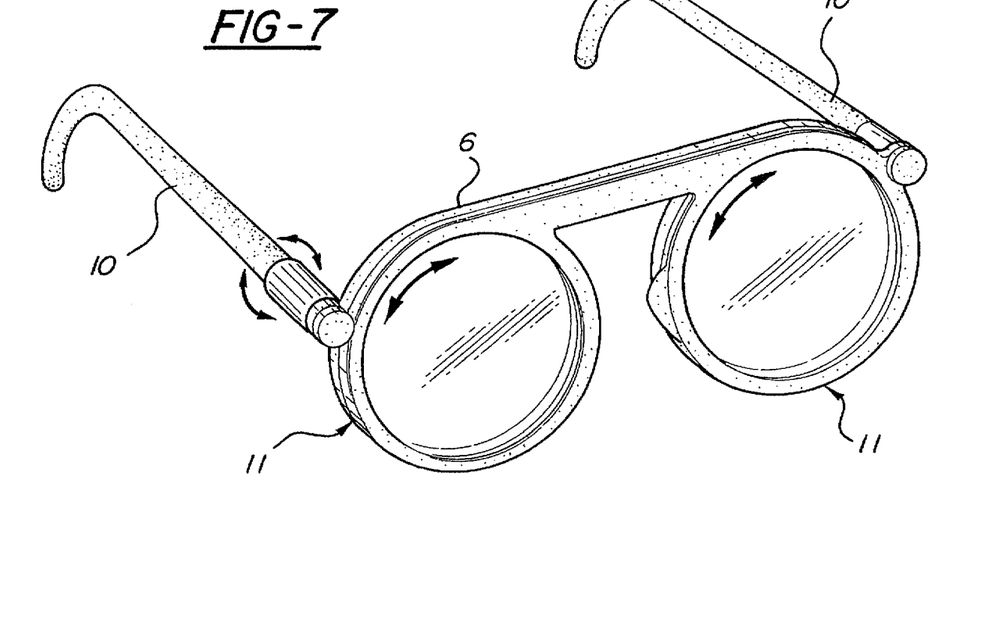
FIG. 7 is a perspective view of the lens assembly of FIG. 5 incorporated into a pair of spectacles, including external actuator structure.
Figure 8:
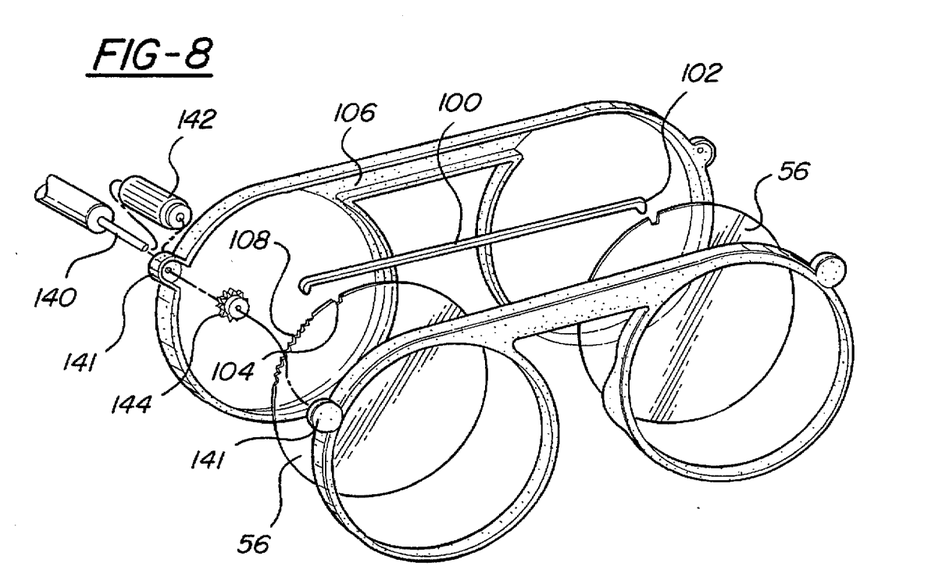
FIG. 8 is an exploded perspective view of the spectacles of FIG. 7.

FIGS. 7 and 8 illustrate a gear mechanism for simultaneously rotating the internal lens elements 56 of the two lens assemblies 11. One of the internal lens elements 56 provided with internal gearing 108 engaged by the teeth of an internal gear 144 which rotates on a shaft 140 sealingly inserted through a suitable aperture in a gear-receiving socket 141 formed in frame elements 6a, 6b. An external, user-adjustable thumb wheel 142 is mounted on the portion of shaft 140 outside chamber 12 to rotate internal gear 144 and the internal lens element 56 via gearing 108. Rotation of thumb wheel 142 by the user simultaneously rotates both internal lens elements 56 connected by belt 100. The sealing of the individual lens assemblies 11 can be performed in one of the various manners described above. Alternately, the lens assemblies 11, their associated chambers 12, and the channel 106 in frame 6 can be sealed as an integral unit as will be apparent to those skilled in the art.

Alternatively, belt 100 may consist of either two separate portions or a continuous portion, as shown in FIGS. 20 through 24

Figures 20, 21, 22:
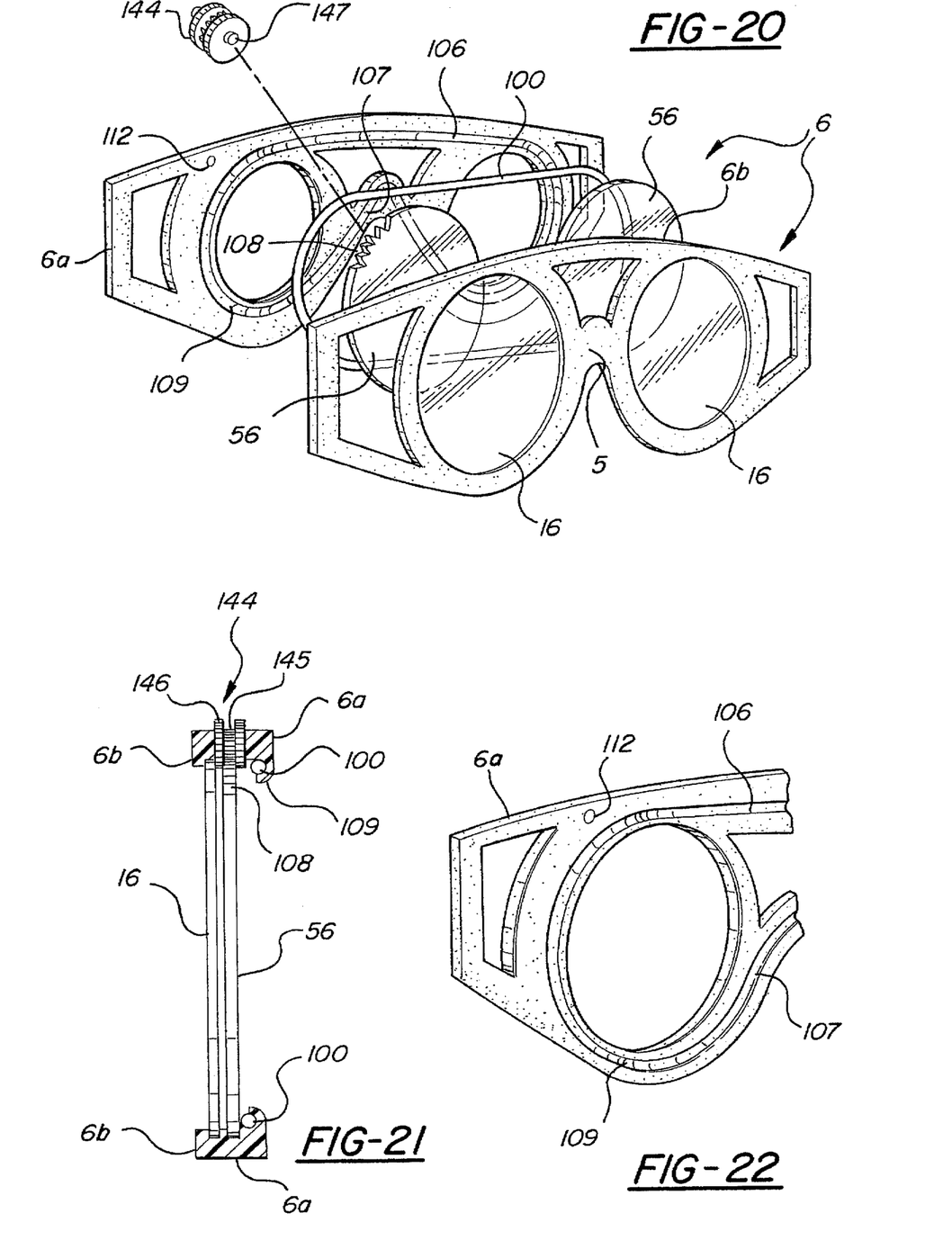
FIG. 20 is an exploded perspective view of the present invention, incorporating a continuous belt drive mechanism.
FIG. 21 is an cross-sectional side-view of the present invention, depicting the arrangement of the belt channel.
FIG. 22 is a perspective view of the belt channel portion of the present invention.

Referring first to FIG. 20, an alternative frame configuration 6, consisting of front and rear frame members 6b and 6a, is shown. As illustrated, the device includes a first pair of panes 16, each pane axially associated with a corresponding internal lens element 56. Alternately, and as described in detail elsewhere in this specification, the device of FIGS. 20 through 24 may be modified to include a second pair of rear panes (not shown); the front 16 and rear panes defining a sealed chamber within which is housed one of the lens elements 56. Such a modification will be apparent to those of ordinary skill in the art, according to the disclosure provided herein. According to the internal drive means of this embodiment, belt 100 comprises a continuous, unitary element. The belt 100 is preferably constructed from a semi-flexible material, such as rubber, thin metal wire, or the like. Rear frame member 6a, which accommodates internal lens elements 56, includes a recessed channel 109 corresponding to a portion of the perimetrical face of each internal lens. Channel 109 is continuous between each internal lens 56, defined in the nose 5 and bridge portions of the frame element 6a as channels 107 and 106, respectively. By means of an outwardly projecting post 102 (FIGS. 23 and 24), a portion of belt 100 is securely fixed to each internal lens by way of adhesive, frictional engagement, or similar methods known to those skilled in the art. One lens element 56 further includes a driven gear 108 along a portion of its circumferential edge (FIG. 20) Driven gear is actuated by an associated external gear 144, which can be operated from without the frame assembly by the wearer.

Referring now to FIG. 21, the components of the drive gear and belt-drive assembly can be seen in greater detail. As depicted, external gear 144 comprises two opposing circular-shaped walls 146, between which is sandwiched the gear element 145. Drive gear 108 and gear 145 are in mechanical engagement, as described above. Each wall may include gnurled circumferential edges, as shown, in order to facilitate operation of the external gear by the wearer. Walls 146 and gear element 145 are coaxial; the gear element characterized by a somewhat smaller diameter than the opposing walls. This configuration creates a retaining slot between the walls of the external gear, so as to prevent unwanted lateral movement of the internal lens during operation. Drive gear 144 is pivotally secured between mated frame halves 6a, 6b by axles 147 which protrude coaxially from either side of the gear (FIGS. 20 and 21.) Each axle rests within an associated aperture 112 in each frame half 6a, 6b.

FIG. 22 illustrates in detail the arrangement of the recessed belt-channel in one side of frame member 6a. Channels 109 in each side of frame half 6a are in communication via channels 106 and 107 in the respective bridge and nose portions of the frame half. The outer circumference of channel portion 109 is approximately the same diameter as lens elements 56 (not shown). Accordingly, belt 100 (not shown) engages a region of the outer perimeter of each lens element 56. It will, of course, be appreciated by those of skill in the art that the internal lenses 56 (not shown) may be of a larger diameter than the front panes 16 (not shown), such that the channel portions are hidden from view in the assembled frames.

Though not illustrated, it will be appreciated by those skilled in the art that the above-mentioned dual-belt drive mechanism functions in much the same manner as the disclosed continuous-belt mechanism; comprising essentially the same elements as the continuous-belt assembly. According to this alternate embodiment, however, belt 100 consists of first and second belt portions. Each such portion is characterized by opposing terminal ends, with the ends of each belt engaging both internal lenses 56. Accordingly, the distinct belt portions are spaced, each occupying either the nose 107 or bridge 105 channels. (FIG. 20.)

Figures 23, 24:
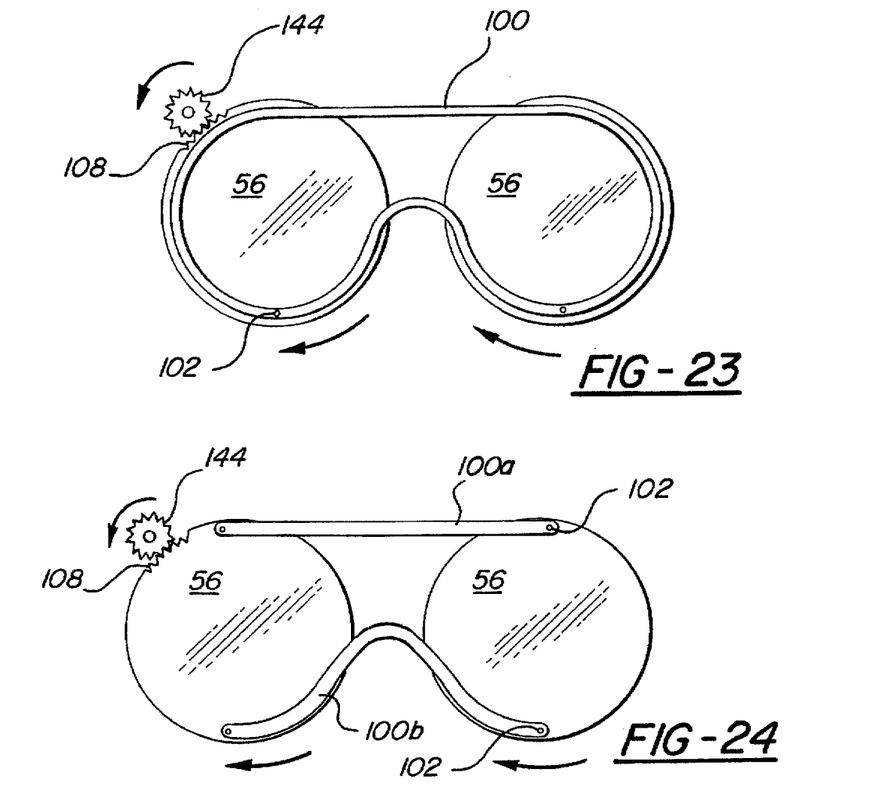
FIG. 23 is an exposed frontal view of the present invention, depicting in simplified detail the continuous-belt drive mechanism.
FIG. 24 is an exposed frontal view of the present invention, depicting in simplified detail the dual-belt drive mechanism.

As depicted in FIGS. 23 and 24, it can be seen that both the dual and continuous-belt configurations result in simultaneous lens 56 rotation. According to the disclosed gear mechanism, rotation of internal gear 144 by the wearer affects rotation of the associated lens 56 through movement of internal gearing 108. By virtue of the belt connection between each lens at posts 102, rotation of one lens result in simultaneous rotation of the other lens. This rotation can proceed in either direction (indicated by arrows), according to the direction of internal gear 144 rotation.

Figure 9:
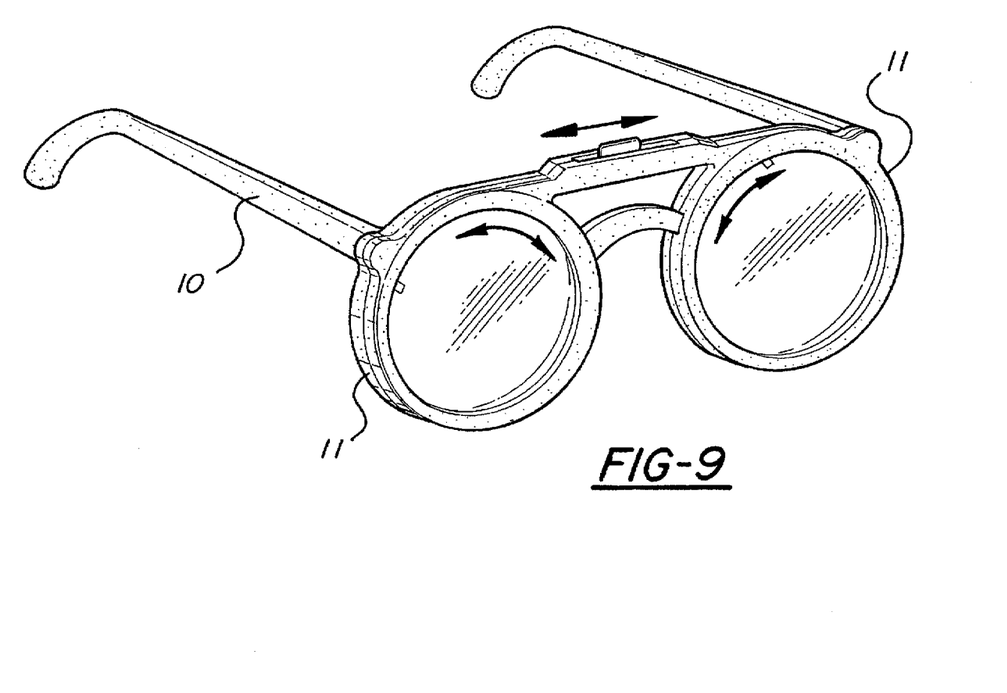
FIG. 9 illustrates an alternate actuator mechanism for the spectacles of FIG. 7.
Figure 10:
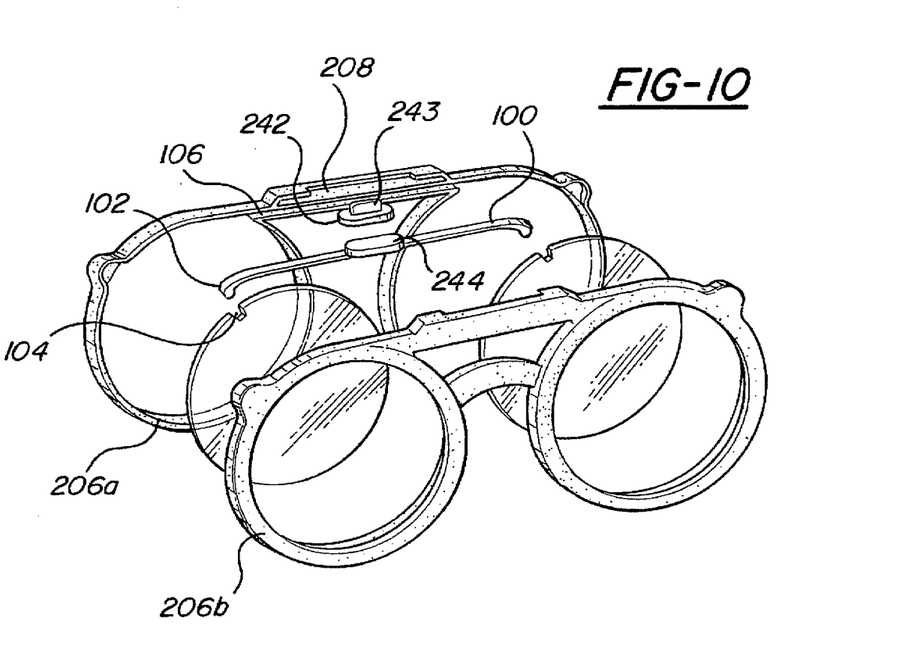
FIG. 10 is an exploded perspective view of the spectacles of FIG. 9.

A slide-operated embodiment of the belt drive of FIGS. 5–8 is shown in FIGS. 9 and 10. Instead of external and internal gearing to rotate one of the internal lens elements 56 and the connecting belt 100, the embodiment of FIGS. 9 and 10 uses a magnetic follower element fastened to belt 100 in channel 106, movable back and forth between the individual lens assemblies 11.

An external sliding magnet 242 with a user-operated driver 243 is located to slide back and forth immediately above a follower 244 on belt 100. Magnet 242 is also attached to drive 243 and slides within a separate chamber 208 above channel 106. As slide magnet 242 is moved back and forth in the direction of the arrow in FIG. 9, internal follower 244 and belt 100 are accordingly moved back and forth to simultaneously rotate internal lens elements 56. Sealing of the individual lens assemblies can be accomplished by sealing follower 244 within sealed frame elements 206a and 206b. In this embodiment sealing is simplified since there is no need for physical connection between driver 243 and follower 244.

Figure 25:
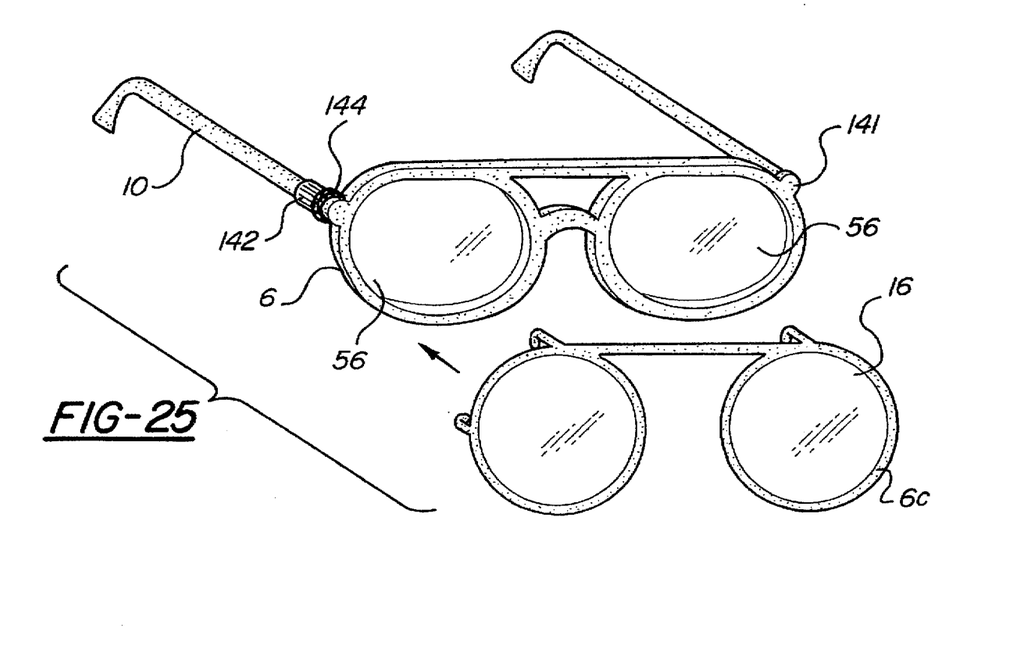
FIG. 25 depicts an alternative embodiment of the present invention, utilizing either of the dual or continuous-belt drive mechanisms.

FIG. 25 depicts a further alternate embodiment of the present invention, wherein only rotatable internal lens-elements 56 are disposed within the mated frame halves 6a and 6b (shown as mated-frame 6). According to this configuration, the front panes 16 of the lens assembly are detachably superimposed on the internal lens-elements 56 by means of a clip-on frame 6c. This permits the wearer to selectively alter the superimposed front panes 16, according to individual preference. Alternatively, the wearer can forego using the superimposed frame 6c altogether. Of course, it will be apparent to those skilled in the art that this embodiment of the present invention can be modified to function with any of the adjustment mechanisms disclosed herein, though it is preferably suited to incorporate any of the disclosed belt-drive mechanism.

Figure 26:
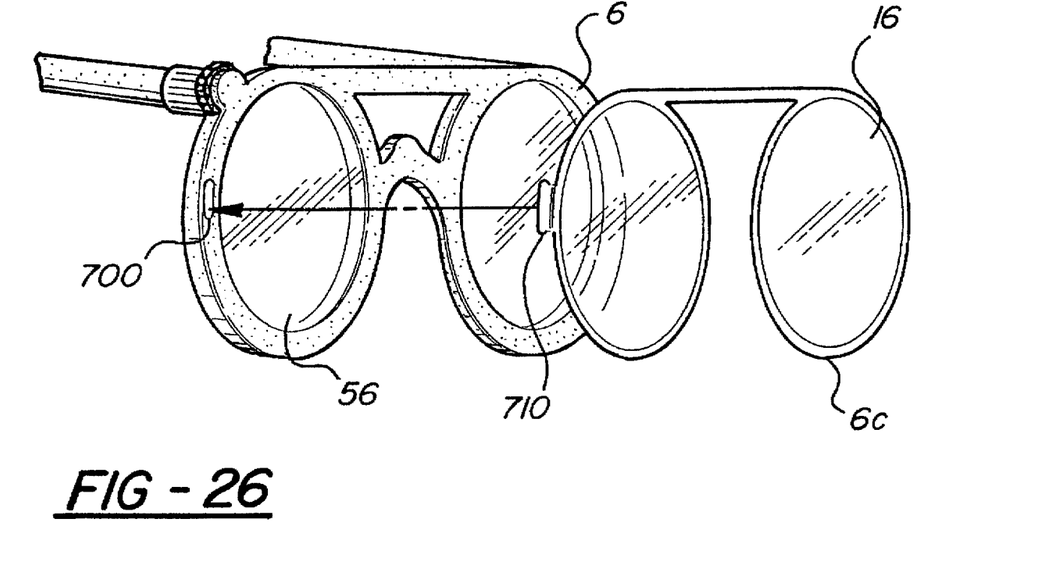
FIG. 26 illustrates the embodiment of FIG. 25, including an alternate means of detachably affixing the separate frame elements.
Figure 27:
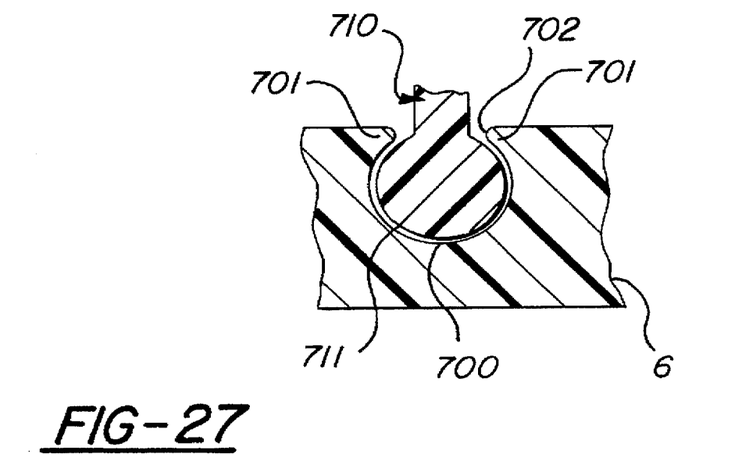
FIG. 27 is an exposed side-view of the alternate means of FIG. 26.

FIGS. 26 and 27 illustrate the embodiment of FIG. 25, incorporating an alternate means by which frame 6c is detachably secured to frame 6. According to this embodiment, frame 6 includes a number of externally exposed, recessed grooves 700. Each groove is integral to the body of frame 6, and corresponds to one of several protrusions 710 extending from frame 6c. Referring to FIG. 27, both protrusion 710 and groove 700 are designed to be detachably mated in a snap-fit arrangement. To this end, protrusion 710 includes a bulbous tip 711 which fits securely within the semi-cylindrical channel defined by groove 700. As illustrated, the upper edges 701 of the groove, defined by its opening, includes rounded shoulder portions 702 extending the length of each edge of the groove. Each rounded edge facilitates the easy insertion of protrusion 710 in groove 700.

Figure 11:
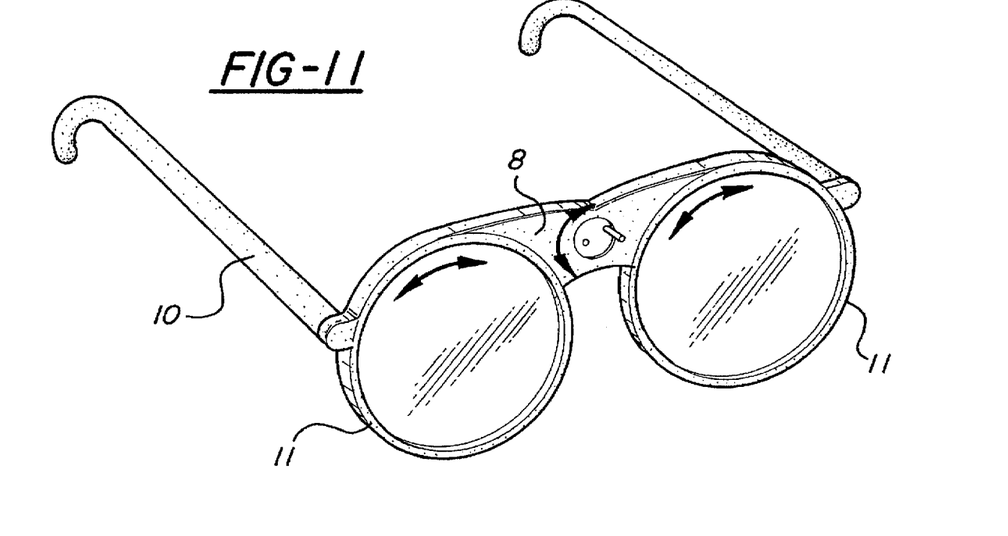
FIG. 11 is a perspective view of an alternate mechanism for rotating the lens assemblies in a pair of spectacles.
Figure 12:
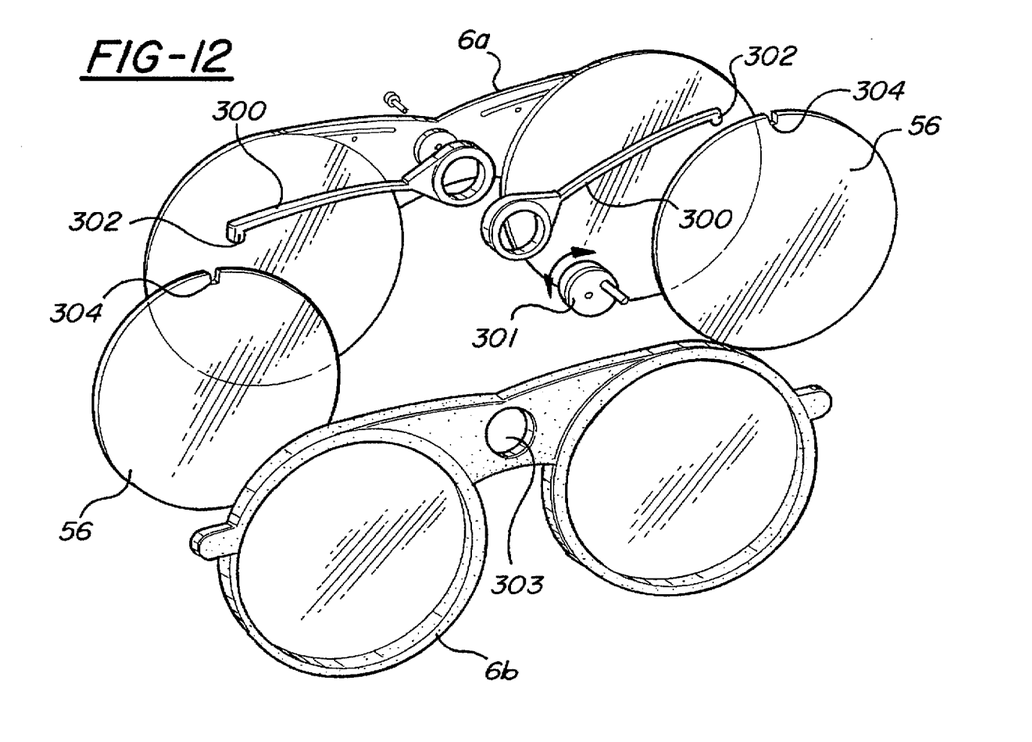
FIG. 12 is an exploded perspective view of the spectacles of FIG. 11.

Yet a further embodiment of a belt-type adjustment mechanism for internal lens elements 56 is shown in FIGS. 11–12, using separate belt portions 300 for each lens element, directly driven by a rotatable knob 301 extending through suitable aperture 303 in the frame elements 6a, 6b in nose piece 8. Using central knob 301, lens elements 56 can be simultaneously rotated in a manner apparent from the illustration.

Figure 13:
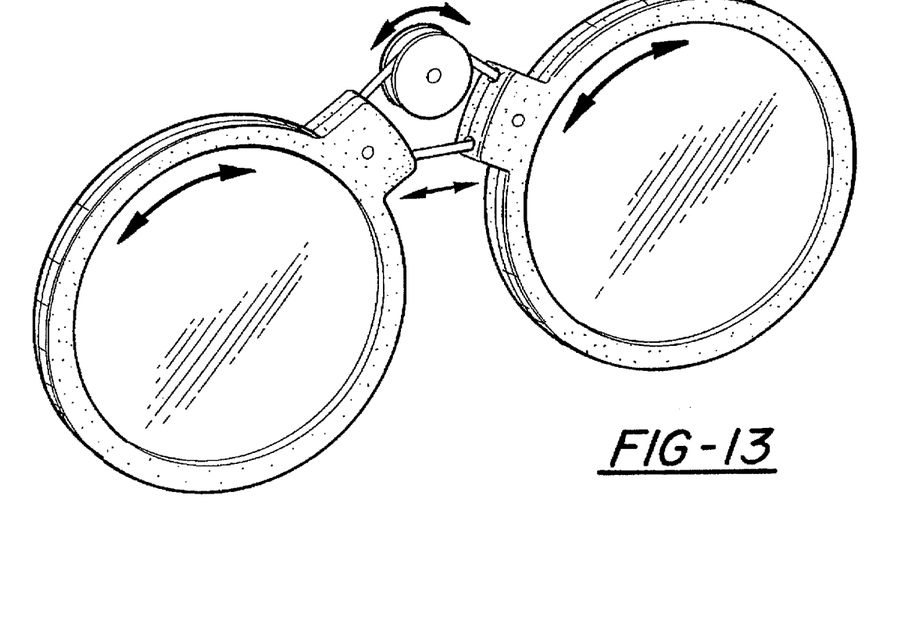
FIG. 13 is a perspective view of another alternate embodiment of a rotating mechanism for a pair of lens assemblies.
Figure 14:
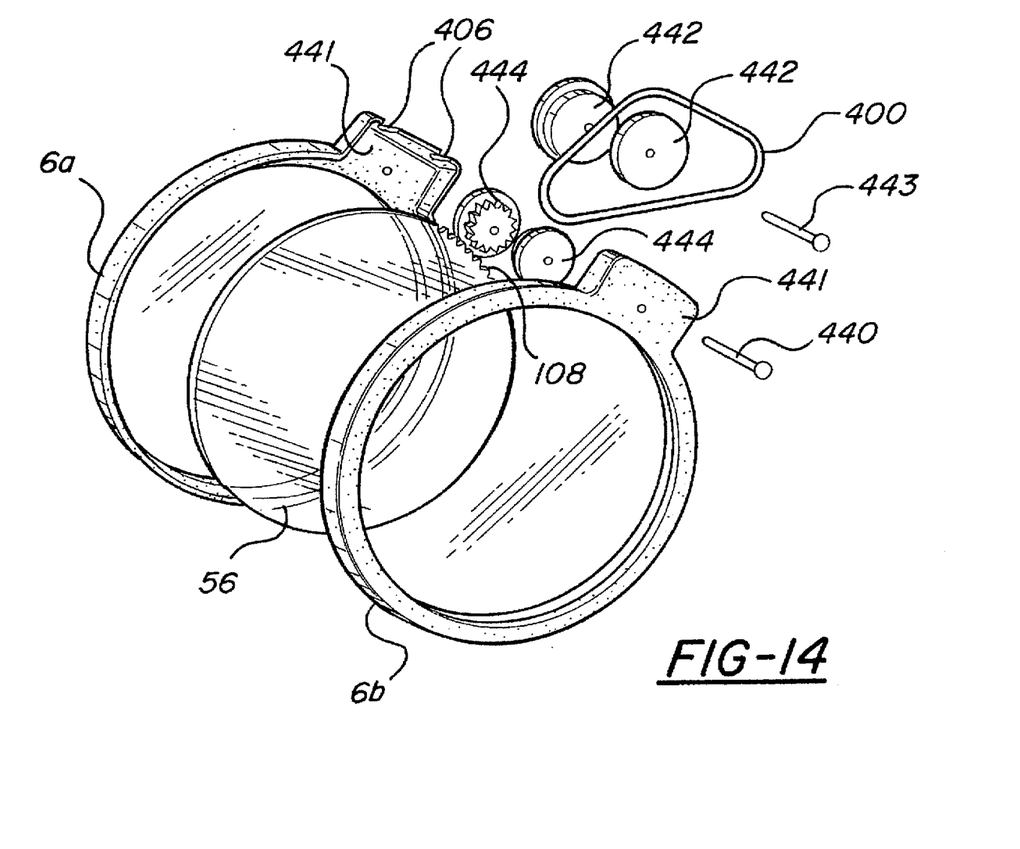
FIG. 14 is an exploded perspective view of the rotating mechanism and one lens assembly of FIG. 13.

Referring to FIGS. 13 and 14, a combined belt and gear drive mechanism for rotating internal lens elements 56 is shown.

A closed loop belt 400 enters each sealed lens assembly 11 through channels 406 in the frame members 6a, 6b. An internal drive element 444 comprising a pulley wheel and gear is rotatably affixed within frame socket 441 on a suitable shaft 440. The pulley wheel portion of internal driven element 444 engages belt 400, while the gear portion of drive element 444 engages gear 108 and internal lens element 56 within the sealed chamber of each lens assembly.

An external drive element 442 comprising a pulley wheel rotating on a shaft 443 frictionally engages belt 400, such that when external drive element 442 is rotated, the belt 400 actuates the internal drive elements 444 in the sealed lens assemblies to rotate internal lens element 56.

External drive 442 can be actuated directly, for example by rotating it with the thumb and forefinger.

Sealing of each individual lens assembly and the internal chamber containing internal lens element 56 can be accomplished in a manner similar to that described in reference to the embodiment of FIGS. 5 and 6. For example, channels 406 can be formed from or include a suitable sealing material which sealingly engages belt 400 but still allows movement of the belt.

The closed belt drive 400, 442 shown in FIG. 14 also can be used in connection with other embodiments of the invention. For example, the FIG. 14 belt drive could be used in FIG. 4 to drive gears 42 on each assembly 11. In this case, the diameter of main gear can be arbitrarily chosen.

Figures 15, 16, 17:
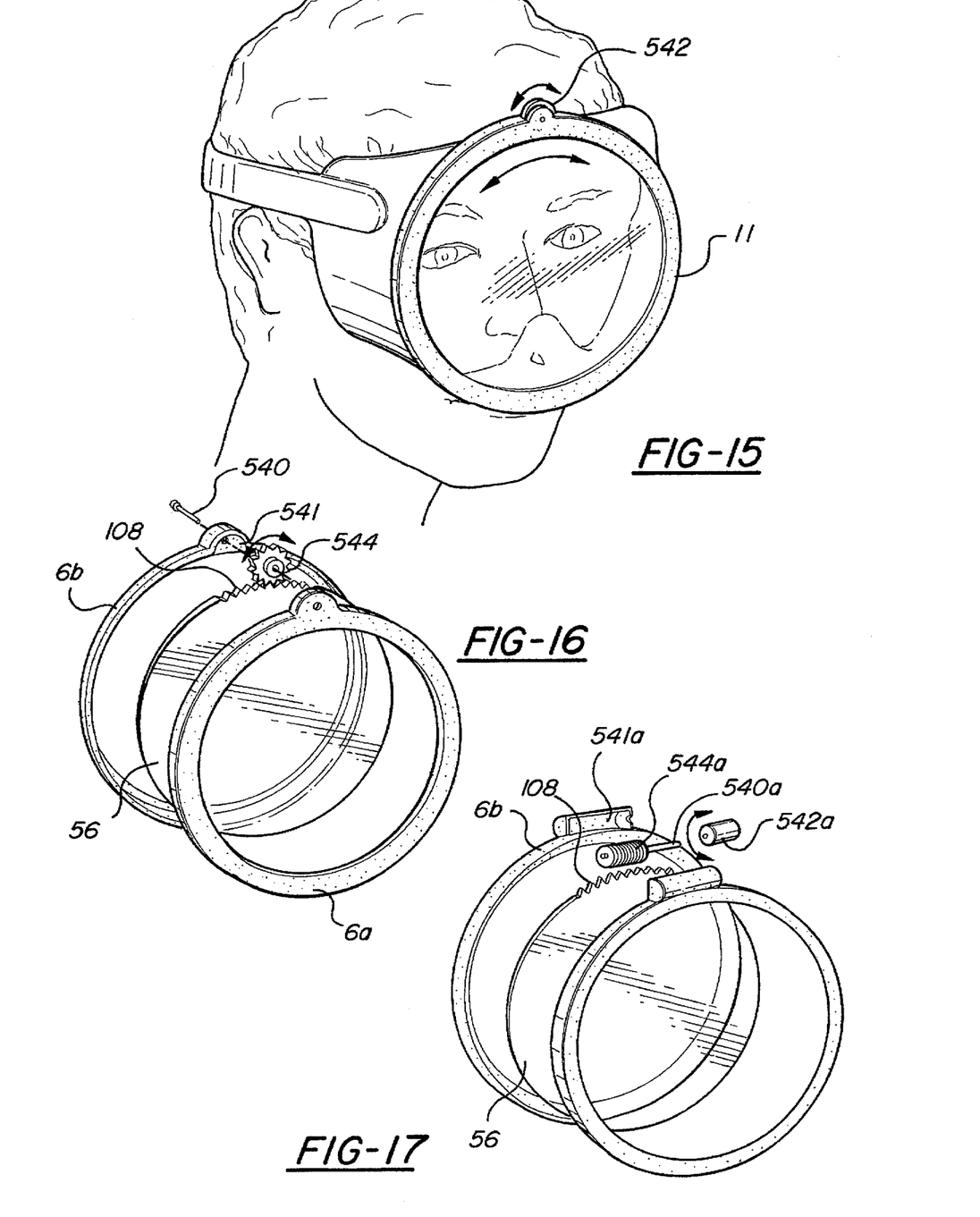
FIG. 15 is a perspective view of an alternate embodiment of the inventive lens assembly in a single lens application.
FIG. 16 is an exploded perspective view of the lens assembly and rotating mechanism of FIG. 15.
FIG. 17 is an exploded perspective view of a lens assembly according to FIG. 15 and an alternate rotating mechanism.

Although the above embodiments describe incorporation of the invention into spectacles, a still further embodiment can be seen in FIGS. 15–17, in which a single sealed lens assembly 11 is provided with an adjustment mechanism. The invention can be used as a traditional optical filter, for example: as a single face mask type lens; with a camera lens, photographic enlarger, a photographic printer or the like; with a telescope lens; etc.

In the single lens assembly embodiments of FIGS. 15–17, two alternate, central adjustment mechanisms for the single internal lens element 56 are shown in FIGS. 16 and 17, respectively. In FIG. 16, a simple, central internal gear 544 engages gearing 108 on internal lens element 56 to rotate it in two directions. Internal gear 544 is rotatably mounted on a sealed shaft 540 extending through suitable apertures in a gear-receiving socket 541 formed by the mating frame elements 6a, 6b. An external thumb wheel 542 (FIG. 15) mounted on the portion of shaft 540 extending from the sealed chamber 12 through frame 6 is used to rotate the internal lens element 56 as desired.

In FIG. 17, a mechanism is shown using an external worm gear 544a engaging gearing 108 on lens element 56. External worm gear 544a is located in socket 541a, and a drive shaft 540a extends from the socket and can be rotated by a suitable thumb knob 542a.

Figure 18:
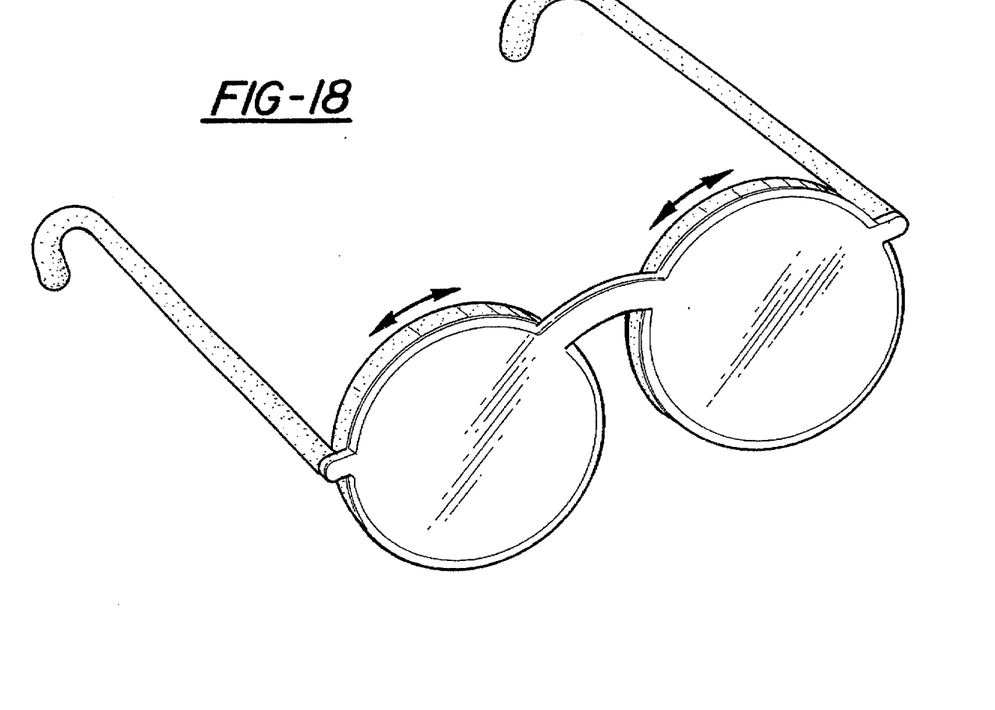
FIG. 18 is a perspective view of another alternate embodiment of a rotating mechanism for a pair of lens assemblies.
Figure 19:
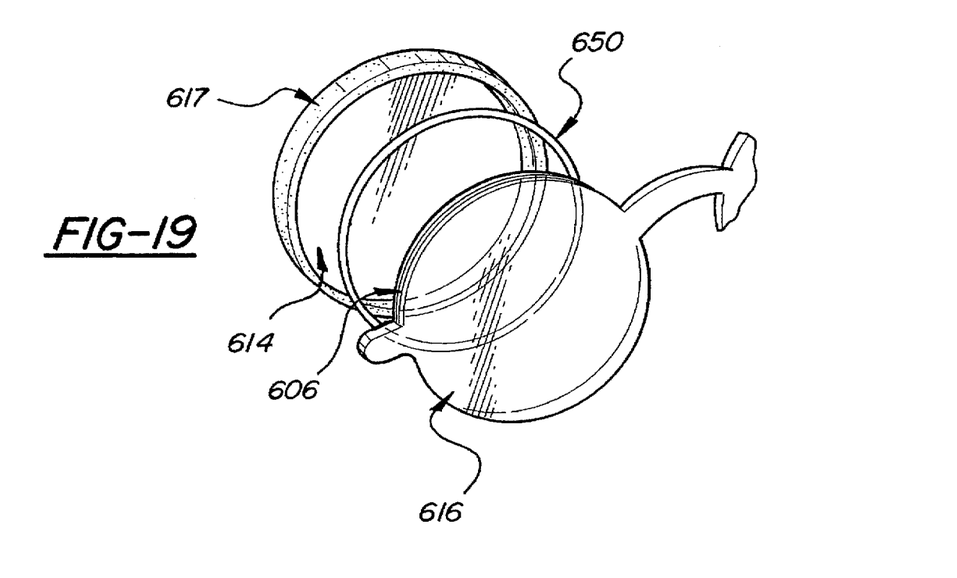
FIG. 19 is an exploded perspective view of the spectacles of FIG. 18.

In FIGS. 18–19, another embodiment of a sealed rotatable chamber is shown using only two lens elements 614 and 616 joined in sealing fashion and rotatable relative to one another. A large o-ring 650 is mounted in a groove 606 on the rim of rear pane 616. The frame wall 617 wall of the front pane 614 when assembed to rear pane 616 overlies and sealingly engages the rim portion of the rear pane 616 and o-ring 650 such that the front pane can be rotated with respect to the rear pane. The o-ring 650 seals the chamber defined by the assembled front pane 614, rear pane 616, the wall part 617 of the front pane, and the o-ring seal on the frame or rim of the rear pane 616. The front pane 614 and the rear pane 616 are both polarizers in this embodiment.

In the illustrated embodiment, each front pane 614 is individually rotated relative to the corresponding rear pane 616 by directly rotating frame portions 617 as shown by the arrows. However, various gear, belt and other drive mechanisms can be employed to rotate both panes 614 simultaneously, for example as described above.

Having thus described my invention, numerous obvious variations hereto will be apparent to those skilled in the art without varying significantly from the substance of my invention which I claim as follows:

1. In a light polarizing lens assembly having a frame, at least one first light polarizing lens element, at least one second light polarizing lens element superimposed with the first lens element and rotatable in relation to said first lens element to affect light transmission through both of said first and second lens elements, the improvement comprising:

A. Said first element comprising a sealed hollow chamber having a front pane, a rear pane, and a continuous wall section joining said panes to define said chamber;

B. Said second lens element comprising a transparent element disposed entirely within said sealed chamber for rotation relative to said first element; and C. Means for incrementally rotating said second element in axial relationship to said first element, said rotating means comprising at least one externally actuated gear provided outside said sealed chamber, at least one sealed force-transmitting gear connected to said externally actuated gear and extending in sealing fashion into said sealed chamber, and internal drive means operated by said at least one force transmitting gear to rotate said second lens element, said internal drive means comprising gear means provided on said second lens element.

2. The light polarizing lens assembly of claim 1, wherein said rotating means includes index means.

3. The light polarizing lens assembly of claim 2, said index means comprising indicia on said rotating means corresponding to the rotational position of said second lens element.

4. In a light polarizing lens assembly having a frame, a first pair of light polarizing lens elements, a second pair of light polarizing lens elements superimposed with said first pair of lens elements and rotatable in relation to said first pair of lens elements to affect light transmission through said first and second pair of lens elements, the improvement comprising:

A. Said first pair of lens elements each comprise a sealed hollow chamber having a front pane, a rear pane, and a continuous wall section joining said panes to define said chamber;

B. Said second pair of elements each comprising a transparent element disposed entirely within said sealed hollow chamber; and C. Magnet means for rotating said second pair of elements in axial relationship to said first pair of elements, said magnet means comprising first internal drive means and second external actuation means, said external actuation means being completely separated from said sealed hollow chamber.

5. In a light polarizing lens assembly having a frame, a first pair of light polarizing lens elements, a second pair of light polarizing lens elements superimposed with said first pair of lens elements and rotatable in relation to said first pair of lens elements to affect light transmission through said first and second pair of lens elements, the improvement comprising:

A. Said first pair of lens elements each comprise a sealed hollow chamber having a front pane, a rear pane, and a continuous wall section joining said panes to define said chamber;

B. Said second pair of lens elements each comprising a transparent element disposed entirely within said sealed hollow chamber; and C. External actuation means provided outside said sealed chamber, and sealed force transmitting means operated by said external actuation means to rotate said second pair of lens elements in axial relationship to said first pair of lens elements, said external actuation means comprising a knob provided outside said sealed hollow chamber and rotatably fixed to said frame in off-axis fashion, said force transmitting means comprising at least first and second arm portions mechanically connecting said knob and one of either of said second lens elements, wherein each of said first and second arms includes an opening for rotatably receiving said knob therethrough in coaxial fashion.

6. In a light polarizing lens assembly including a frame, a first pair of light polarizing lens elements, a second pair of light polarizing lens elements superimposed with said first lens elements and rotatable in relation to said first lens elements to affect light transmission through said first and second pairs of lens elements, the improvement comprising:

A. Means for rotating said second pair of lens elements in axial relationship to said first pair of elements, said means including externally actuated gear means at least partially protruding without said frame, a driven gear disposed on at least one of said second pair of elements and provided in mechanical communication with said gear means to rotate said at least one of said second pair of elements, and internal drive means comprising belt means connecting said second pair of lens elements, such that operation of said gear means effects simultaneous rotation of both said second pair of elements.

7. The light polarizing lens assembly of claim 6, in which said belt means comprise first and second belts, each of said first and second belts connecting said second lens elements.

8. The light polarizing lens assembly of claim 6, wherein said belt means comprise a unitary and continuous belt portion.

9. In a light polarizing lens assembly including a first frame having a continuous wall section with at least a first lens element disposed therein, said first lens element rotatable with respect to said frame, and means for rotating said first lens element relative to said frame, the improvement comprising:

said first frame including at least one externally opening groove; and a second frame including at least a second lens element disposed therein, said second frame including at least one protrusion securely axially mateably received within said groove to detachably axially superimpose said first and second frames.

10. The light polarizing lens assembly of claim 9, wherein said means for rotating said first lens element relative to said frame comprise belt means.

11. The light polarizing lens assembly of claim 10, wherein said belt means further comprises first and second belt portions.

12. The light polarizing lens assembly of claim 10, wherein said belt means further comprises a continuous belt portion.

13. In a light polarizing lens assembly including a first frame having a continuous wall section with at least a first lens element disposed therein, said first lens element rotatable with respect to said frame, and means for rotating said first lens element relative to said frame, the improvement comprising:

said first frame member including at least one externally opening groove;

a second frame including at least a second lens element disposed therein, said second frame including at least one protrusion mateable with said groove, whereby said second frame may be detachably secured to said frame such that said second lens element is axially superimposed over said first lens element; and a pair of lens elements comprising front and rear panes and disposed within said first frame, said front and rear panes further being coaxially aligned to define a sealed chamber in which said first lens element is disposed in axial relation to said front and rear panes.

14. In a light polarizing lens assembly including a frame, a first pair of light polarizing lens elements, a second pair of light polarizing lens elements superimposed with said first lens elements and rotatable in relation to said first lens elements to affect light lens transmission through said first and second pairs of lens elements, the improvement comprising:

means for rotating said second pair of lens elements in axial relationship to said first pair of elements, said means including externally actuated internal gear means at least partially protruding without said frame, internal drive means comprising belt means connecting said second pair of elements to affect simultaneous rotation thereof, and a driven gear provided in mechanical communication with said gear means to affect rotation of at least one of said second pair of lens elements.

15. The light polarizing lens assembly of claim 14, wherein said driven gear is integral with said belt means.

16. The light polarizing lens assembly of claim 14, wherein said driven gear is provided on one of said second pair of lens elements.

* * * * *

UNITED STATES PATENT AND TRADEMARK OFFICE
CERTIFICATE OF CORRECTION

PATENT NO. : 5,663,779
DATED : September 2, 1997
INVENTOR(S) : Karasawa

It is certified that error appears in the above-indentified patent and that said Letters Patent is hereby corrected as shown below:

Column 6, line 45, delete "drive" and insert --driven--;

Column 7, line 19, delete "internal" and insert --external--;

Column 7, line 25, delete "internal" and insert --external--;

Column 8, line 25, delete "driven" and insert --drive--.

Signed and Sealed this

First Day of September, 1998

Attest:

BRUCE LEHMAN

Attesting Officer

Commissioner of Patents and Trademarks